(12) United States Patent
Weaver et al.

(10) Patent No.: US 10,766,190 B2
(45) Date of Patent: Sep. 8, 2020

(54) ADDITIVE MANUFACTURING APPARATUS AND RELATED PROCESS

(71) Applicant: GENERAL ELECTRIC COMPANY, Schenectady, NY (US)

(72) Inventors: Scott Andrew Weaver, Ballston Lake, NY (US); Anthony Joseph Vinciquerra, Rexford, NY (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 15/823,778

(22) Filed: Nov. 28, 2017

(65) Prior Publication Data

US 2019/0160741 A1   May 30, 2019

(51) Int. Cl.
| | | |
|---|---|---|
| *B29C 64/205* | (2017.01) | |
| *B33Y 10/00* | (2015.01) | |
| *B33Y 30/00* | (2015.01) | |
| *B29C 64/153* | (2017.01) | |

(Continued)

(52) U.S. Cl.
CPC .......... *B29C 64/205* (2017.08); *B22F 3/1055* (2013.01); *B28B 1/001* (2013.01);
(Continued)

(58) Field of Classification Search
CPC ... B29C 64/153; B29C 64/214; B29C 64/241; B29C 64/205; B22F 3/1055; B22F 2003/1056
See application file for complete search history.

(56) References Cited

U.S. PATENT DOCUMENTS

| | | |
|---|---|---|
| 5,252,264 A | 10/1993 | Forderhase et al. |
| 8,047,251 B2 | 11/2011 | Khoshnevis |

(Continued)

FOREIGN PATENT DOCUMENTS

| | | | | |
|---|---|---|---|---|
| CN | 106513680 A | * | 3/2017 | ............. B33Y 30/00 |
| EP | 2730353 A1 | | 5/2014 | |

OTHER PUBLICATIONS

Lin, English translation of CN 106513680 A, Mar. 22, 2017 (Year: 2017).*

(Continued)

*Primary Examiner* — Anthony Calandra
*Assistant Examiner* — Eric T Chen
(74) *Attorney, Agent, or Firm* — Armstrong Teasdale LLP

(57) ABSTRACT

Additive manufacturing apparatus including a build module is presented. The build module includes a support structure; a powder supply chamber formed in the support structure; and powder applicator disposed on the support structure and located proximate to the powder supply chamber. The build module further includes a powder recovery chamber and a plurality of build plates spatially disposed around the powder recovery chamber, the plurality of build plates configured to move around the powder recovery chamber. The build module is configured such that during an additive manufacturing process step, a build plate of the plurality of build plates is disposed between the powder supply chamber and the powder recovery chamber, and the powder applicator is configured to distribute a required amount of the powder material from the powder supply chamber on the build plate and deposit any excess powder material in the powder recovery chamber. Related processes are also presented.

11 Claims, 11 Drawing Sheets

(51) Int. Cl.
  *B22F 3/105* (2006.01)
  *B28B 1/00* (2006.01)
  *C03B 19/01* (2006.01)
  *B29C 64/245* (2017.01)
  *B33Y 40/00* (2020.01)
  *B29C 64/241* (2017.01)

(52) U.S. Cl.
  CPC .......... *B29C 64/153* (2017.08); *B29C 64/241* (2017.08); *B29C 64/245* (2017.08); *B33Y 10/00* (2014.12); *B33Y 30/00* (2014.12); *B33Y 40/00* (2014.12); *C03B 19/01* (2013.01); *B22F 2003/1056* (2013.01); *B22F 2003/1058* (2013.01); *B22F 2003/1059* (2013.01)

(56) References Cited

U.S. PATENT DOCUMENTS

| | | | |
|---|---|---|---|
| 9,486,961 | B2 | 11/2016 | Okazaki |
| 9,505,057 | B2 | 11/2016 | Nordkvist et al. |
| 2014/0015172 | A1 | 1/2014 | Sidhu et al. |
| 2014/0367367 | A1 | 12/2014 | Wood et al. |
| 2017/0028472 | A1 | 2/2017 | Shaw et al. |
| 2017/0120332 | A1 | 5/2017 | Demuth et al. |

OTHER PUBLICATIONS

Wiria et al., "Selective laser sintering adaptation tools for cost effective fabrication of biomedical prototypes", Rapid Prototyping Journal, vol. 16, Issue: 2, 2010,12 Pages.

Vaezi et al., "Multiple Material Additive Manufacturing—Part 1: A Review", ResearchGate, Article in Virtual and Physical Prototyping—Mar. 2013, 33 Pages.

Shirazi et al., "A review on powder-based additive manufacturing for tissue engineering: selective laser sintering and inkjet 3D printing",National Institute for Materials Science, Science and Technology of Advanced Materials, Sci. Technol. Adv. Mater. 16 (2015) 033502 ,21 Pages.

* cited by examiner

ADDITIVE MANUFACTURING APPARATUS AND RELATED PROCESS

BACKGROUND

Embodiments of the disclosure generally relate to an additive manufacturing apparatus. More particularly, embodiments of the disclosure relate to an additive manufacturing apparatus including a plurality of build plates configured to move around a powder recovery chamber.

Powder bed technologies are some examples of additive manufacturing processes. However, in powder bed technology, as the build takes place in the powder bed, conventional additive manufacturing systems may use a large amount of powder, which may increase the associated costs with the process. Further, the higher build times of typical powder-based technologies could result in lower efficiencies of the associated additive manufacturing processes. The dwell time of the re-coater blade, i.e., the time taken by the blade to drive across the build plate, may affect the build times in these systems Accordingly, there remains a need for an additive manufacturing apparatus that allows for minimization of powder usage and wastage in the additive manufacturing apparatus, and accelerated build times.

BRIEF DESCRIPTION

In one aspect, the disclosure relates to an additive manufacturing apparatus including a build module. The build module includes a support structure; a powder supply chamber formed in the support structure; and powder applicator disposed on the support structure and located proximate to the powder supply chamber. The powder supply chamber is configured to contain and supply a powder material. The build module further includes a powder recovery chamber formed in the support structure such that the powder supply chamber is disposed between the powder applicator and the powder recovery chamber. The build module furthermore includes a plurality of build plates formed in the support structure and spatially disposed around the powder recovery chamber, the plurality of build plates configured to move around the powder recovery chamber. The build module is configured such that during an additive manufacturing process step, a build plate of the plurality of build plates is disposed between the powder supply chamber and the powder recovery chamber, and the powder applicator is configured to distribute a required amount of the powder material from the powder supply chamber on the build plate and deposit any excess powder material in the powder recovery chamber.

In another aspect, the disclosure relates to an additive manufacturing apparatus process including (a) disposing a build plate of a plurality of build plates between a powder supply chamber and a powder recovery chamber; (b) distributing a required amount of a powder material from a powder supply chamber on the build plate, using a powder applicator; (c) depositing any excess powder material in the powder recovery chamber, using the powder applicator; and (d) directing an energy beam from a directed energy source onto the powder material distributed on the build plate to form a build component. The additive manufacturing apparatus process further includes: (e) moving the plurality of build plates around the powder recovery chamber, after the build component is formed such that a subsequent build plate of the plurality of build plates is disposed between the powder supply chamber and the powder recovery chamber; (f) distributing a required amount of the powder material from the supply chamber on the subsequent build plate, using the powder applicator; (g) depositing any excess powder in the powder recovery chamber, using the powder applicator; and (h) directing an energy beam from the directed energy source to the powder material, distributed on the subsequent build plate, to form a subsequent build component.

In yet another aspect, the disclosure relates to an additive manufacturing apparatus process for manufacturing a plurality of parts. The process includes: (i) disposing a build plate of a plurality of build plates between a powder supply chamber and a powder recovery chamber; (ii) distributing a required amount of a powder material from a powder supply chamber on the build plate, using a powder applicator; (iii) depositing any excess powder material in the powder recovery chamber, using the powder applicator; (iv) directing an energy beam from a directed energy source to the powder material, distributed on the build plate, to form a build layer; (v) repeating steps (ii) and (iv) until a part of the plurality of parts is formed; (vi) rotating the plurality of build plates after the part is formed such that a subsequent build plate of the plurality of build plates is disposed between the powder supply chamber and the powder recovery chamber; and (vii) repeating steps (ii) to (vi) until the plurality of parts is formed.

These and other features, embodiments, and advantages of the present disclosure may be understood more readily by reference to the following detailed description.

DRAWINGS

These and other features, aspects, and advantages of the present disclosure will become better understood when the following detailed description is read with reference to the accompanying drawings, wherein.

DETAILED DESCRIPTION

Figure 1:
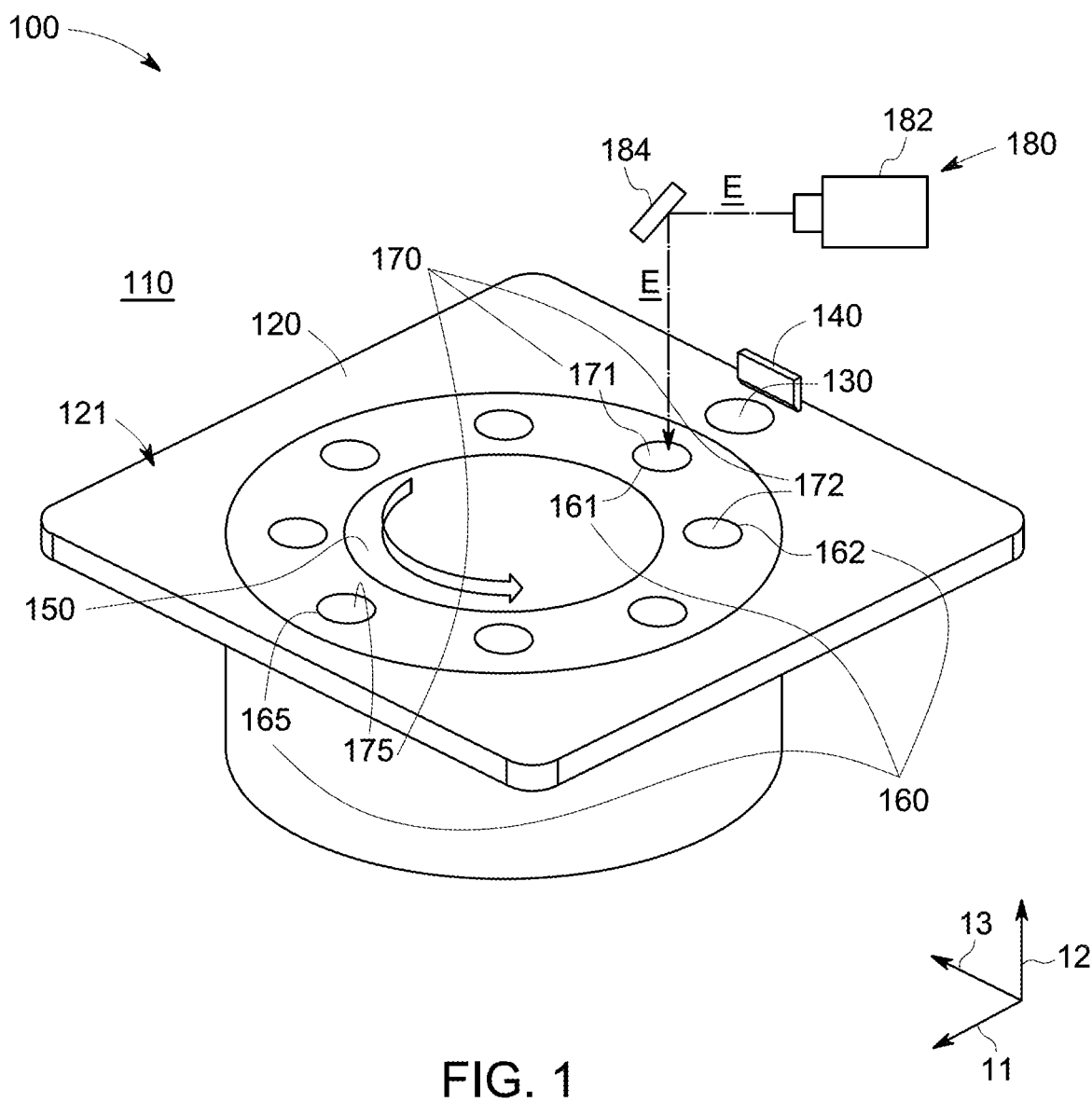
FIG. 1 illustrates a schematic of an additive manufacturing apparatus, in accordance with some embodiments of the disclosure.

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value solidified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the solidified term. Here and throughout the specification and claims, range limitations may be combined and/or interchanged, such ranges are identified and include all the sub-ranges contained therein unless context or language indicates otherwise.

As mentioned earlier, conventional additive manufacturing processes may result in increased powder usage and wastage, and further higher build times. The methods described herein address the noted shortcomings in conventional additive manufacturing apparatus, at least in part, through incorporating a plurality of build plates disposed around the powder recovery chamber. Further, accelerated builds may be achieved by designing the apparatus configuration such that the powder applicator has shorter stroke lengths.

In some embodiments, an additive manufacturing apparatus is presented. The additive manufacturing apparatus includes a build module. The build module includes a support structure; a powder supply chamber formed in the support structure; and a powder applicator disposed on the support structure and located proximate to the powder supply chamber. The build module further includes a powder recovery chamber formed in the support structure such that the powder supply chamber is disposed between the powder applicator and the powder recovery chamber. The build module furthermore includes a plurality of build plates formed in the support structure and spatially disposed around the powder recovery chamber, the plurality of build plates configured to move around the powder recovery chamber.

The build module is configured such that during an additive manufacturing process step, a build plate of the plurality of build plates is disposed between the powder supply chamber and the powder recovery chamber, and the powder applicator is configured to distribute a required amount of the powder material from the powder supply chamber on the build plate and distribute any excess powder material in the powder recovery chamber.

According to the embodiments described herein, the additive manufacturing apparatus is capable of forming a desired object or structure using an additive manufacturing process. "Additive manufacturing" is a term used herein to describe a process which involves layer-by-layer construction or additive fabrication (as opposed to material removal as with conventional machining processes). Such processes may also be referred to as "rapid manufacturing processes". The additive manufacturing process forms net or near-net shape structures through sequentially and repeatedly distributing and joining material layers. As used herein the term "near-net shape" means that the additively manufactured structure is formed very close to the final shape of the structure, not requiring significant traditional mechanical finishing techniques, such as machining or grinding following the additive manufacturing process. Additive manufacturing systems and methods include, for example, and without limitation, vat photopolymerization, powder bed fusion, binder jetting, material jetting, sheet lamination, material extrusion, directed energy deposition and hybrid systems. These systems and methods may include, for example, and without limitation, stereolithography; digital light processing; scan, spin, and selectively photocure; continuous liquid interface production; selective laser sintering; direct metal laser sintering; selective laser melting; electron beam melting; selective heat sintering; multi-j et fusion; smooth curvatures printing; multi-jet modeling; laminated object manufacture; selective deposition lamination; ultrasonic additive manufacturing; fused filament fabrication; fused deposition modeling; laser metal deposition; laser engineered net shaping; direct metal deposition; hybrid systems; and combinations of these methods and systems. These methods and systems may employ, for example, and without limitation, all forms of electromagnetic radiation, heating, sintering, melting, curing, binding, consolidating, pressing, embedding, and combinations thereof.

These methods and systems employ materials including, for example, and without limitation, polymers, plastics, metals, ceramics, sand, glass, waxes, fibers, biological matter, composites, and hybrids of these materials. These materials may be used in these methods and systems in a variety of forms as appropriate for a given material and method or system, including for example without limitation, liquids, solids, powders, sheets, foils, tapes, filaments, pellets, liquids, slurries, wires, atomized, pastes, and combinations of these forms.

In certain embodiments, suitable additive manufacturing processes include, but are not limited to, the processes known to those of ordinary skill in the art as direct metal laser melting (DMLM), direct metal laser sintering (DMLS), direct metal laser deposition (DMLD), laser engineered net shaping (LENS), selective laser sintering (SLS), selective laser melting (SLM), electron beam melting (EBM), fused deposition modeling (FDM), binder jet technology, or combinations thereof.

FIG. 1 illustrates an additive manufacturing apparatus 100 in accordance with some embodiments of the present disclosure. As illustrated in FIG. 1, the additive manufacturing apparatus 100 includes a build module 110. The build module 110 includes a support structure 120. The support structure 120 is a rigid structure and defines a worksurface 121. In FIG. 1, the support structure 120 is illustrated as having a square cross-section profile, however, any other suitable cross-sectional profiles are also encompassed within the scope of the disclosure. Non-limiting examples of other suitable cross-sectional profiles include any other rectilinear cross-sectional profile (e.g., a rectangular cross-sectional profile, a triangular cross-sectional profile, or a trapezoidal cross-sectional profile), a circular cross-sectional profile, or an oval cross-sectional profile.

The support structure 120 further includes a powder supply chamber 130 formed in the support structure 120. As illustrated in FIG. 1, the powder supply chamber 130 is formed in the worksurface 121 of the support structure 120. The powder supply chamber is for containing and supplying a powder material. During operation of the additive manufacturing apparatus, the powder supply chamber 130 further includes the powder material 132 (shown in FIG. 2). The powder supply chamber 130 is characterized by a cross-sectional profile that may be a circular cross-sectional profile or a rectilinear cross-sectional profile. Non-limiting examples of suitable rectilinear cross-sectional profiles include a square cross-sectional profile, a rectangular cross-sectional profile, a triangular cross-section profile, or a trapezoidal cross-sectional profile. The example embodiment in FIG. 1 illustrates a circular cross-sectional profile for illustration purposes.

The build module 110 further includes a powder applicator 140 disposed on the worksurface 121 of the support structure 120, and located proximate to the powder supply chamber 130. In some embodiments, the powder applicator 140 may be a rigid, laterally-elongated structure that is disposed on or contacts the worksurface 121 and is moveable on the worksurface 121. The powder applicator 140 may be operably connected to an actuator (not shown in Figures) operable to selectively move the powder applicator 140 parallel to the worksurface 121. As depicted in FIG. 1, the powder applicator 140 moves from right to left, in the direction 11, to supply powder from the powder supply chamber 130 to a build plate of the plurality of build plates 170.

Referring again to FIG. 1, the build module 110 further includes a powder recovery chamber 150 formed in the support structure 120 such that the powder supply chamber 130 is disposed between the powder applicator 140 and the powder recovery chamber 150. The powder recovery chamber 150 is characterized by a cross-sectional profile that may be a circular cross-sectional profile or a rectilinear cross-sectional profile. Non-limiting examples of suitable rectilinear cross-sectional profiles include a square cross-sectional profile, a rectangular cross-sectional profile, a triangular cross-section profile, or a trapezoidal cross-sectional profile. The example embodiment in FIG. 1 illustrates a circular cross-sectional profile for illustration purposes.

The build module 110 furthermore includes a plurality of build chambers 160 formed in the support structure 120. The plurality of build chambers includes a plurality of build plates 170 formed in the support structure 120. As illustrated in FIG. 1, the plurality of build plates 170 is spatially disposed around the powder recovery chamber 150. In some embodiments, the plurality of build plates 170 may be uniformly distributed around the powder recovery chamber 150. The plurality of build plates 170 is further configured to move around the powder recovery chamber 150. The plurality of build plates 170 may be operably connected to an actuator (not shown in Figures), operable to selectively move the plurality of build plates during an additive manufacturing process step such that during an additive manufacturing process step, a build plate of the plurality of build plates 170 is disposed between the powder supply chamber 130 and the powder recovery chamber 150. For example, in the embodiment illustrated in FIG. 1, the build plate 171 of the plurality of build plates 170 is disposed between the powder supply chamber 130 and the powder recovery chamber 150. The build plate 171 is further configured to receive a powder material from the powder supply chamber 130 via the powder applicator 140.

As mentioned earlier, the powder recovery chamber 150 may have any suitable cross-sectional profile. In certain embodiments, the powder recovery chamber 150 may have a circular cross-sectional profile. In such instances, the plurality of build plates 170 is circumferentially disposed around the powder recovery chamber 150 and configured to rotate around the powder recovery chamber 150. The plurality of build plates 170 may be configured to move in a clockwise or a counter-clockwise direction around the powder recovery chamber 150. As noted earlier, an additive manufacturing apparatus configuration that incorporates a central powder recover chamber may reduce the overall powder usage and wastage by the system.

In some embodiments, the plurality of build plates 170 includes 6 to 24 build plates, spatially disposed around the powder recovery chamber 150. In certain embodiments, the plurality of build plates 170 includes 8 to 12 build plates, spatially disposed around the powder recovery chamber 150.

Figure 2:
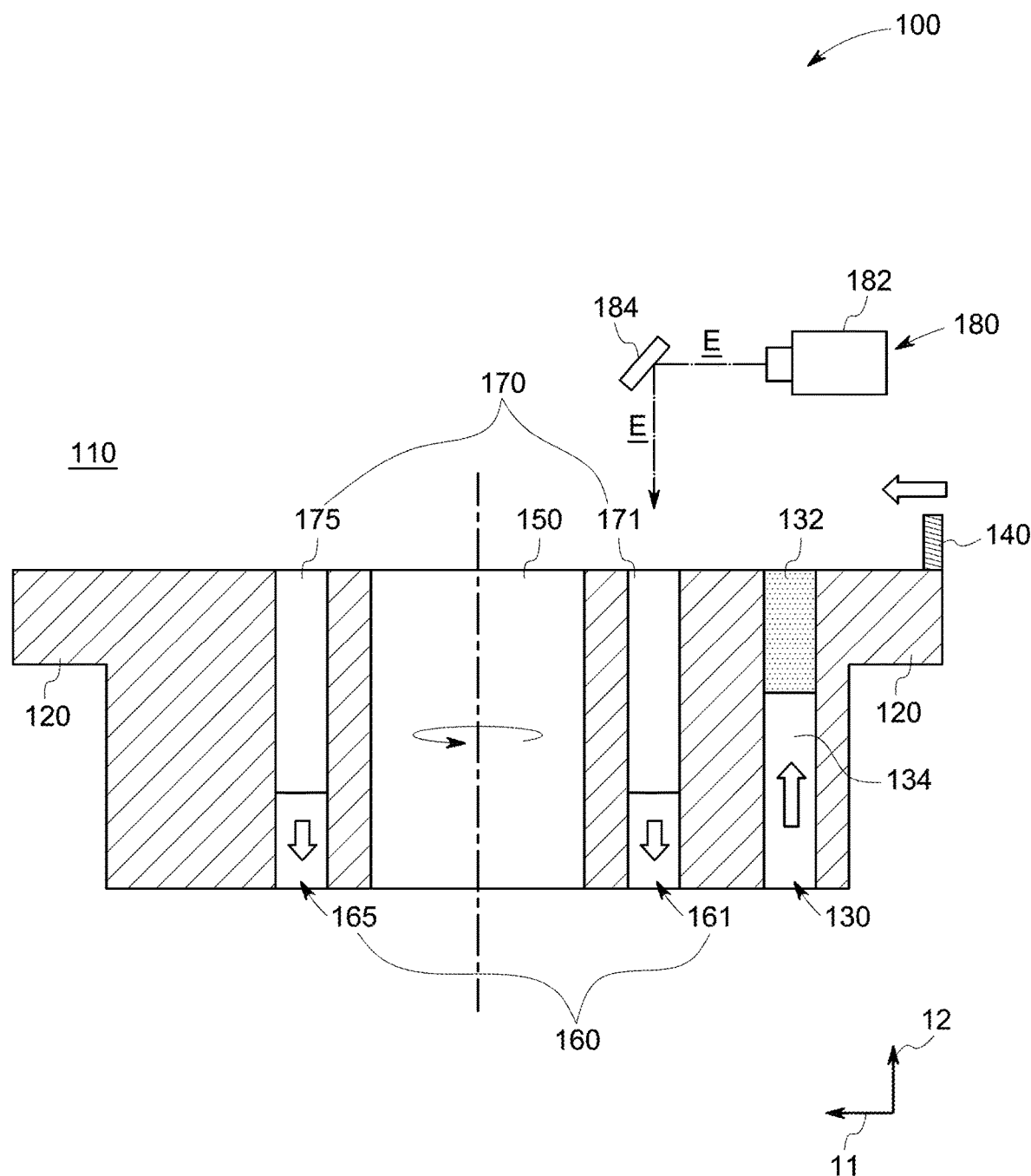
FIG. 2 illustrates cutaway view of an additive manufacturing apparatus, in accordance with some embodiments of the disclosure.

Referring now to FIG. 2, a side-view of the build module 110 of the additive manufacturing apparatus 100, is illustrated. The build module 110 includes a support structure 120 and a powder supply chamber 130 formed in the support structure. The build module further includes a powder recovery chamber 150 and a plurality of build chambers 160 including a plurality of build plates 170, formed in the support structure 120. The build module 110 further includes a powder applicator 140 disposed on the worksurface 121 of the support structure 120, and proximate to the powder supply chamber 130.

As illustrated in FIG. 2, during operation of the additive manufacturing apparatus, the powder supply chamber 130 includes a powder material 132. Non-limiting examples of the suitable powder material may include a metallic (including metal alloys) powder, a polymeric powder, a ceramic powder, or combinations thereof. The powder supply chamber 130 further includes a supply piston 134. The supply piston 134 may be any suitable structure that is vertically moveable within the powder supply chamber 130. The supply piston 134 may be further operatively coupled to an actuator (not shown in Figures), operable to selectively move the supply piston 134 up or down.

As mentioned previously, each build chamber of the plurality of build chambers 160 includes a build plate, collectively referred to as a plurality of build plates 170. Each build plate of the plurality of build plates 170 is vertically moveable in the build chamber 160. Similar to the supply piston 134, each build plate of the plurality of build plates 170 may be operatively coupled to a corresponding actuator (not shown in Figures) that is operable to selectively move the corresponding build plate, up or down. Non-limiting examples of suitable actuators for the supply piston 134 and the plurality of build plates 170 may include pneumatic cylinders, hydraulic cylinders, ballscrew actuators, linear electric actuators, or combinations thereof. Further, the operating principle of the actuators for the supply piston 134 and the plurality of build plates 170 may be the same or different.

In some embodiments, a build plate of a plurality of build plates 170 has a largest dimension in a range from about 25 mm to about 75 mm. In some embodiments, a build plate of a plurality of build plates 170 has a largest dimension of about 25 mm.

The powder applicator 140 is configured to distribute a required amount of the powder material from the powder supply chamber 130 on the build plate of the plurality of build plates 170, and deposit any excess powder material in the powder recovery chamber 150. This is further illustrated in FIGS. 3A-3F (described in detail below).

In some embodiments, the build module 110 is configured such that a maximum stroke length of the powder applicator 140 is in a range from about 90 mm to about 180 mm. The term "stroke length" as used herein refers to the maximum distance covered by the powder applicator 140 in one direction during one build step of an additive manufacturing build cycle. As noted earlier, accelerated builds may be achieved by designing the apparatus configuration such that the powder applicator has shorter stroke lengths. Shorter stroke lengths of the powder applicator may reduce the time taken by the powder applicator to move across the build plate in forward and backward direction, during one build cycle, thus reducing the overall build time taken during one build cycle.

Referring now to FIGS. 1 and 2, the additive manufacturing apparatus 100 further includes an energy module 180. The energy module 180 includes a directed energy source 182 configured to direct an energy beam "E" onto the powder material 132 distributed on a build plate of the plurality of build plates 170, to form a build component 191 (shown in FIG. 3C).

The directed energy source 182 may include any device operable to generate a beam of suitable power and other operating characteristics, to melt and fuse the powder during the build process, described in more detail below. Suitable directed energy sources include, but are not limited to, laser device, an electron beam device, an infra-red (IR) device, an ultra-violet (UV) device, or combinations thereof. The laser device includes any laser device operating in a power range and other operating conditions for melting the powder material 132, such as, but not limited to, a fiber-optic laser, a $CO_2$ laser, or a ND-YAG laser.

In some embodiments, a beam steering apparatus 184 may also be used to direct the energy beam "E" from the directed energy source 182. The beam steering apparatus 184 may include one or more mirrors, prisms, or lenses. The beam-steering apparatus may be further operatively coupled to one or more actuators (not shown in Figures), and arranged so that an energy beam "E" from the directed energy source 182 can be focused to a desired spot size and steered to a desired position in an X-Y plane coincident with the worksurface 121.

Referring again to FIG. 1, the build module 110 is further configured to move the plurality of build chambers 160 after the build component is formed such that a subsequent build plate of the plurality of build plates 170 is disposed between the powder supply chamber 130 and the powder recovery chamber 150. The powder applicator 140 is further configured to distribute a required amount of the powder material from the powder supply chamber 130 on the subsequent build plate and distribute any excess powder in the powder recovery chamber 150. For example, if a build plate 171 is disposed between the powder supply chamber 130 and the powder recovery chamber 150, during one build cycle; in the next build cycle, the build module may move such that the build plate 172 is disposed between the powder supply chamber 130 and the powder recovery chamber 150. The term "build cycle" as used herein may refer to a cycle in which a build layer is formed, or, alternately, to a cycle in which a final part is formed. In the embodiments described above, the directed energy source 182 is further configured to direct an energy beam "E" onto the powder material distributed onto the subsequent build plate (for example, plate 172 in FIG. 1), to form a subsequent build component.

In some embodiments, the build component is a build layer, and the build module 110 is configured to move the plurality of build plates 170 after the build layer is formed such that a subsequent build plate of the plurality of build plates 170 is disposed between the powder supply chamber 130 and the powder recovery chamber 150. In such instances, the build module 110 is configured to fabricate a plurality of build layers on a plurality of build plates in a sequential manner until the plurality of parts is formed.

In some embodiments, the build component is a part, and the powder applicator 140 and the directed energy source 182 are configured to perform one or more cycles of distributing a powder material, directing an energy beam, and forming a build layer until the part is formed. Further, in such instances, the build module 110 is configured to move the plurality of build plates 170 after the part is formed such that a subsequent build plate (for example plate 172 in FIG. 1) of the plurality of build plates 170 is disposed between the powder supply chamber 130 and the powder recovery chamber 150. The term "part" as used herein refers to the final part that is manufactured by the additive manufacturing apparatus, which comprises of a plurality of build layers.

Figure 3A:
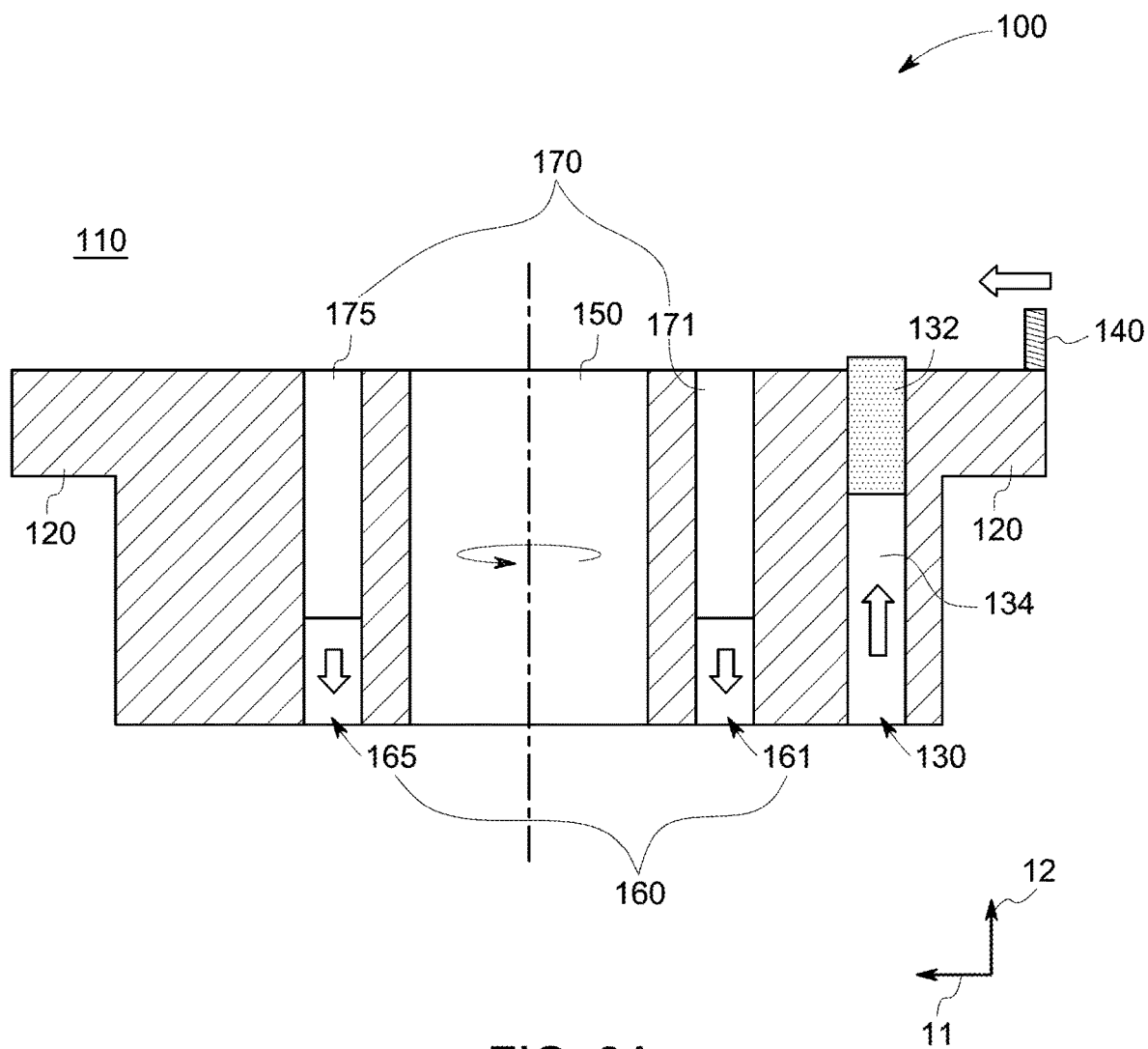
FIG. 3A illustrates a cutaway view of an additive manufacturing apparatus, in accordance with some embodiments of the disclosure.
Figure 3B:
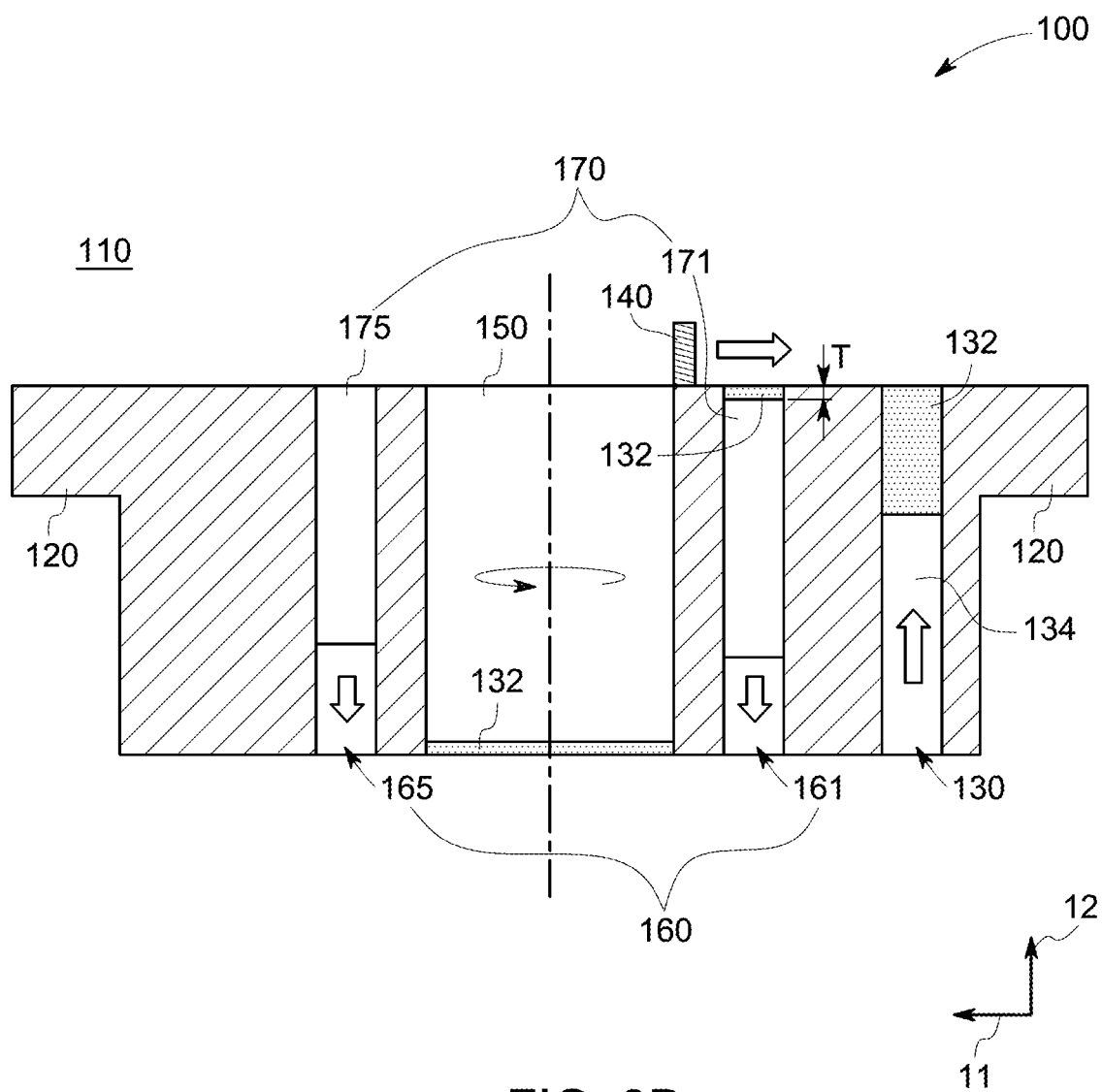
FIG. 3B illustrates a cutaway view of an additive manufacturing apparatus, in accordance with some embodiments of the disclosure.
Figure 3C:
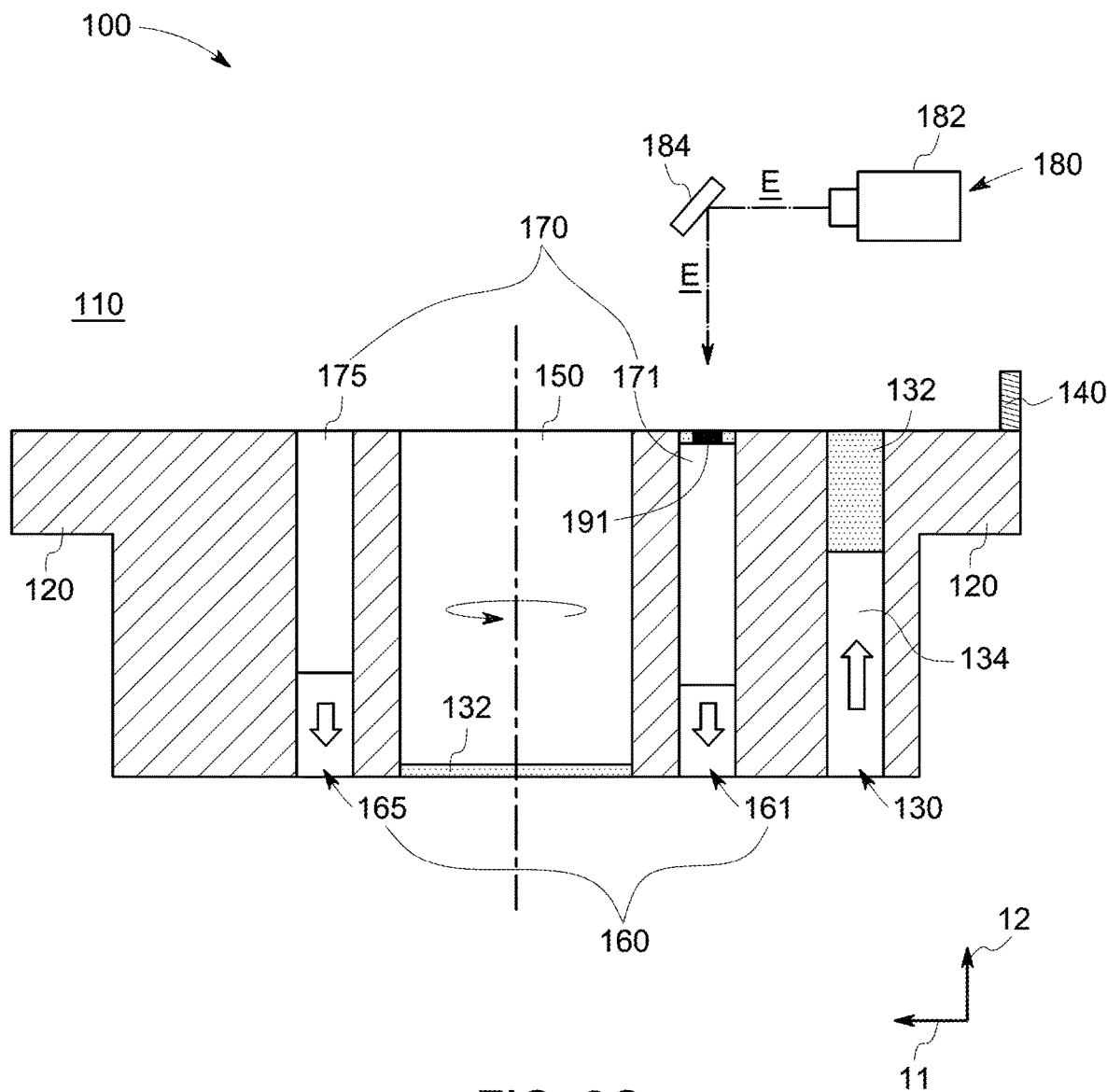
FIG. 3C illustrates a cutaway view of an additive manufacturing apparatus, in accordance with some embodiments of the disclosure.
Figure 3D:
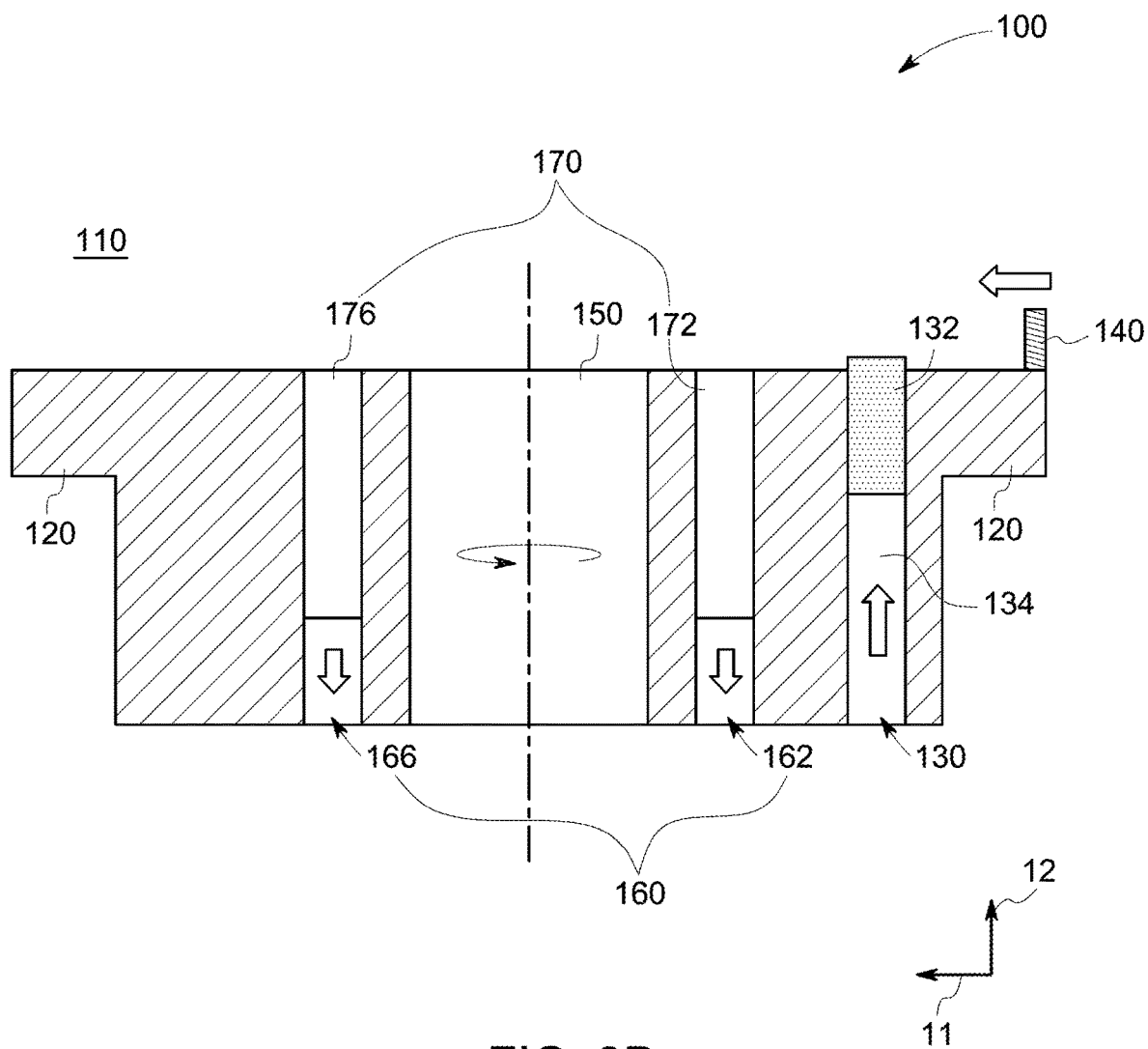
FIG. 3D illustrates a cutaway view of an additive manufacturing apparatus, in accordance with some embodiments of the disclosure.
Figure 4:
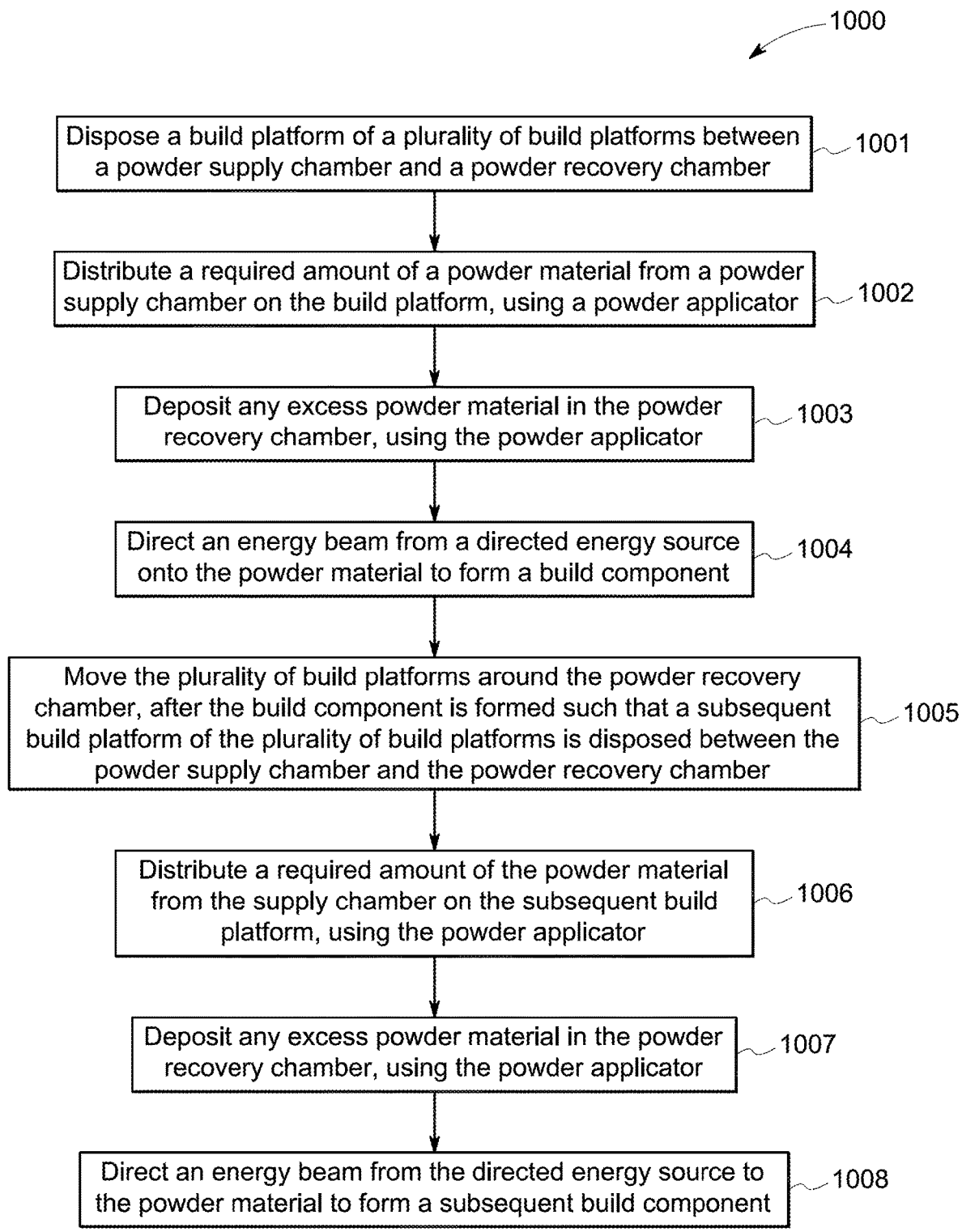
FIG. 4 is a flow chart of an additive manufacturing process, in accordance with some embodiments of the disclosure.

The operation of the additive manufacturing apparatus 100 and the related additive manufacturing process 1000, for a build cycle, is further described in the context of FIGS. 3A-3D and FIG. 4. As shown in FIGS. 3A and 4, at step 1001, the method includes disposing a build plate 171 of a plurality of build plates 170 between a powder supply chamber 130 and a powder recovery chamber 150. The supply piston 134 in the powder supply chamber 130 is configured to supply a required amount of the powder material 132 from the powder supply chamber 130 to a powder applicator 140. As further illustrated in FIG. 3A, when the supply piston 134 is moved upward (direction 12) in the powder supply chamber 130, a required amount of the powder material 132 may be raised and exposed above the worksurface 121. The amount of powder material that is exposed above the worksurface 121 may be controlled by suitable actuators (not shown in Figures). Further, the amount of powder material supplied by the supply piston 134 may be sufficient for a build component 191 (described in detail later).

Referring now to FIGS. 3B and 4, at step 1002, the process 1000 includes distributing the supplied powder material 132 on the build plate 171 of the plurality of build plates 170. Therefore, during a build cycle, after the required amount of powder material 132 is supplied by the supply piston 134 to the powder applicator 140, the powder applicator 140 moves in the horizontal direction (direction 11) and deposits the supplied powder material on the build plate 171. Also, as shown in FIG. 3B, during this stage, either during or after the distribution of the powder material 132, the build plate 171 may move vertically downward by a build layer thickness "T" increment. At step 1003, the process 1000 further includes depositing any excess powder 132 in the powder recovery chamber 150, using the powder applicator 140. In some embodiments, the steps 1002 and 1003 may be effected simultaneously.

The process 1000 further includes directing an energy beam "E" from the energy source 182 onto the powder material distributed on the build plate 171, to form a build component 191, as shown in FIG. 3C and FIG. 4 (step 1004).

In some instances, when the build component 191 is a part, the method may include removal of the part from the build plate 171 after this step.

FIGS. 3A to 3C corresponding to steps 1001 to 1004 of FIG. 4 may be referred to as a build cycle of the additive manufacturing process. As mentioned previously, the term "build cycle" as used herein refers to a cycle in which a build layer is formed, or, alternatively, to a cycle in which a final part is formed.

The operation of the additive manufacturing apparatus 100 and the related additive manufacturing process 1000, for a subsequent build cycle, is further described in the context of FIGS. 3D-3F and FIG. 4. In the subsequent build cycle, the process 1000 includes, at step 1005, moving the plurality of build plates 170 around the powder recovery chamber 150, after the build component 191 is formed. The plurality of build plates 170 is moved such that a subsequent build plate 172 of the plurality of build plates 170 is disposed between the powder supply chamber 130 and the powder recovery chamber 150, as shown in FIG. 3D. The supply piston 134 further supplies a required amount of the powder material from powder supply chamber 130 to the powder application 140 to build a subsequent build component 192.

Figure 3E:
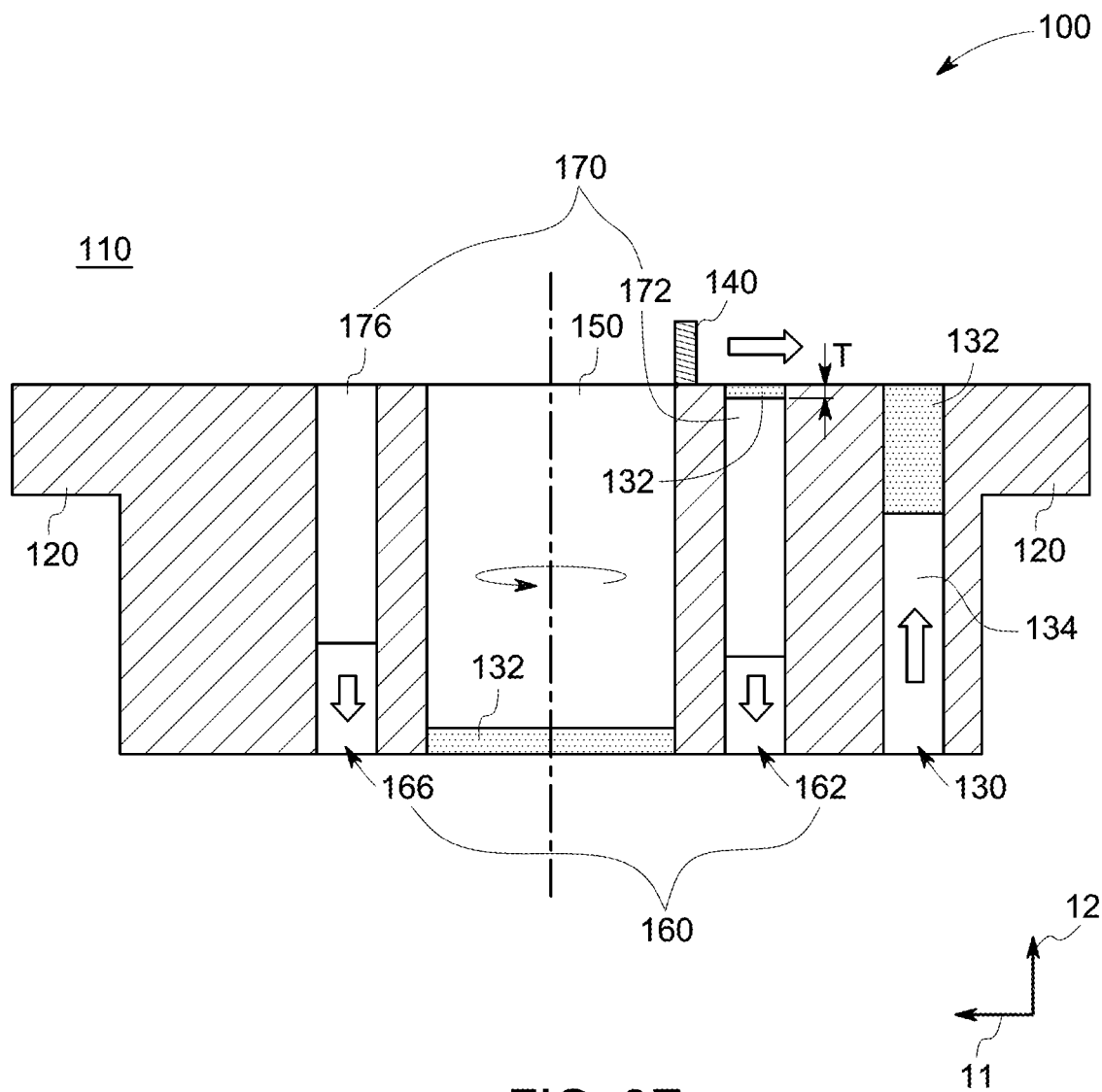
FIG. 3E illustrates a cutaway view of an additive manufacturing apparatus, in accordance with some embodiments of the disclosure.
Figure 3F:
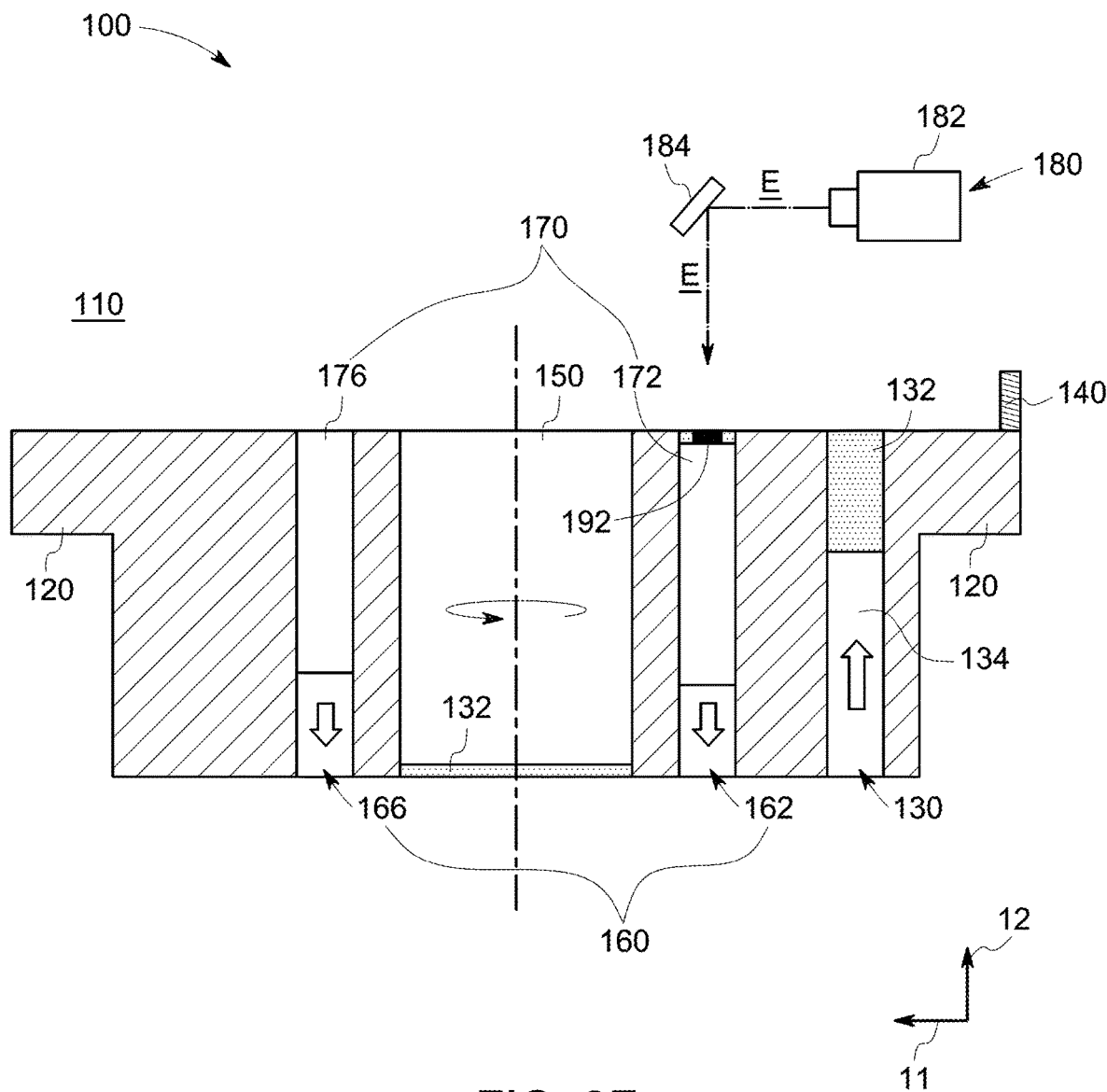
FIG. 3F illustrates a cutaway view of an additive manufacturing apparatus, in accordance with some embodiments of the disclosure.

Referring now to FIGS. 3E and 4, at steps 1006 and 1007, the process 1000 includes distributing the supplied powder material 132 on the build plate 172 of the plurality of build plates 170 and depositing any excess powder 132 in the powder recovery chamber 150, using the powder applicator 140. The process 1000 further includes directing an energy beam "E" from the energy source 182 onto the powder material distributed on the build plate 172, to form a subsequent build component 192, as shown in FIG. 3F and FIG. 4 (step 1008). As mentioned earlier, in instances when the build component 192 is a part, the method may include removal of the part from the build plate 172 after this step. Although not shown in the Figures, the method may include implementation of additional build cycles until the desired number of parts are completed.

In some embodiments, the build component 191, 192 is a build layer. In such instances, the additive manufacturing process 1000 includes moving the plurality of build plates 170 after the build layer is formed such that the subsequent build chamber of the plurality of build chambers is disposed between the powder supply chamber 130 and the powder recovery chamber 150.

In some other embodiments, the build component 191, 192 is a part. In such instances, wherein the build component is a part, the additive manufacturing process 1000 includes performing one or more cycles of distributing a powder material, directing an energy beam, and forming a build layer until the part is formed. Further, in such instances, the additive manufacturing process includes moving the plurality of build plates 170 after the part is formed such that the subsequent build plate of the plurality of build chambers is disposed between the powder supply chamber 130 and the powder recovery chamber 150.

Figure 5:
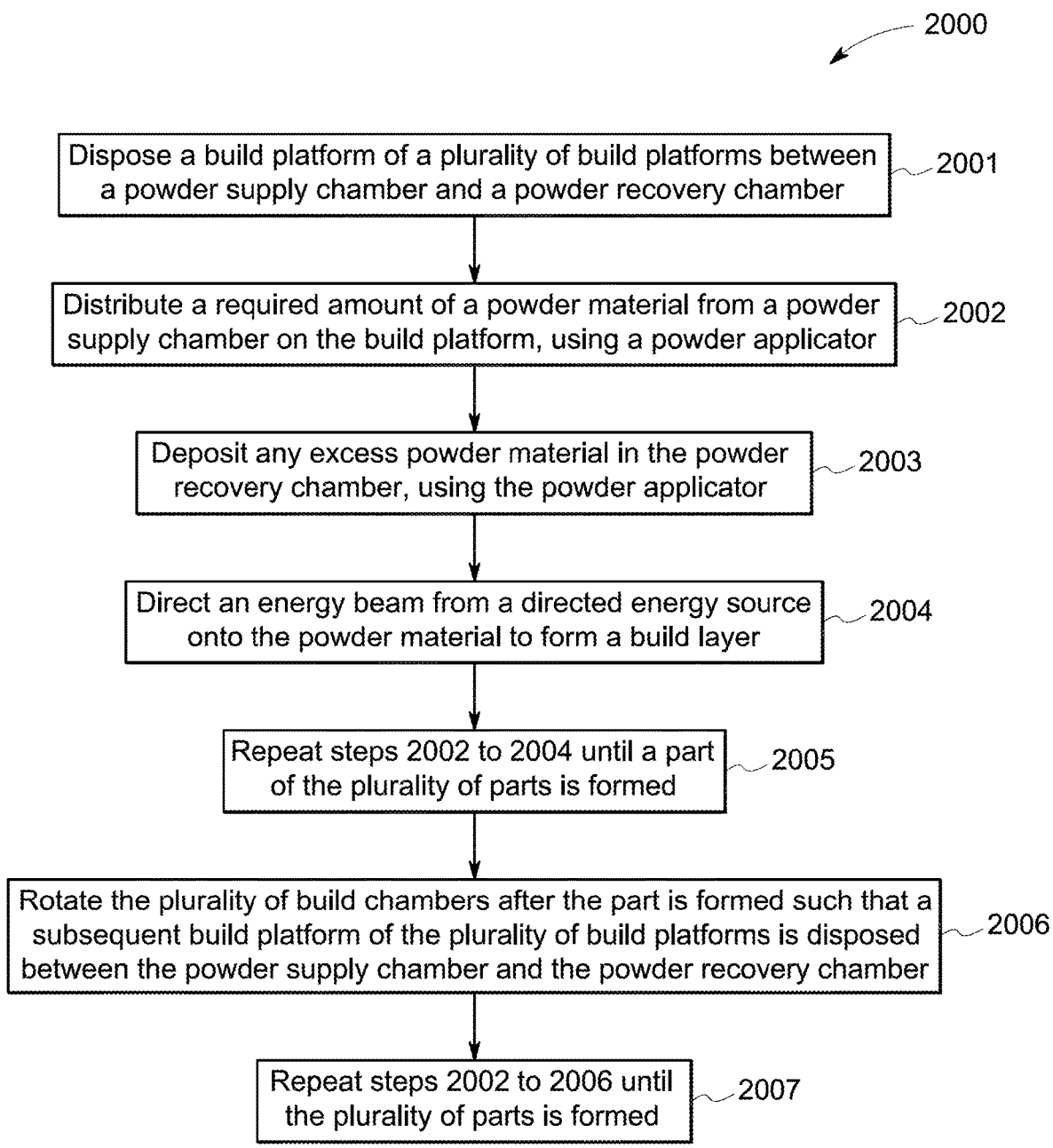
FIG. 5 is a flow chart of an additive manufacturing process, in accordance with some embodiments of the disclosure.

FIG. 5 illustrates a flow a chart for an additive manufacturing process 2000 for manufacturing a plurality of parts, in accordance with some embodiments of the disclosure. FIG. 5 is described herein in conjunction with FIG. 1. The process 2000 includes, at step 2001, disposing a build plate 171 of a plurality of build plates 170 between a powder supply chamber 130 and a powder recovery chamber 150. The process 2000 further includes, at step 2002, distributing a required amount of a powder material from a powder supply chamber 130 on the build plate 171, using a powder applicator 140. The process furthermore includes, at step 2003, depositing any excess powder material in the powder recovery chamber 150, using the powder applicator 140. The process 2000 further includes, at step 2004, directing an energy beam from a directed energy source 182 to the powder material, distributed on the build plate 171, to form a build layer 191. At step 2005, the process 2000 includes repeating steps 2002 to 2004 until a part of the plurality of parts is formed. The process 2000 furthermore includes rotating the plurality of build plates 170 after the part is formed such that a subsequent build plate (e.g., plate 172) of the plurality of build plates 170 is disposed between the powder supply chamber 130 and the powder recovery chamber 150. The steps 2002 to 2006 are repeated until the plurality of parts is formed.

Figure 6:
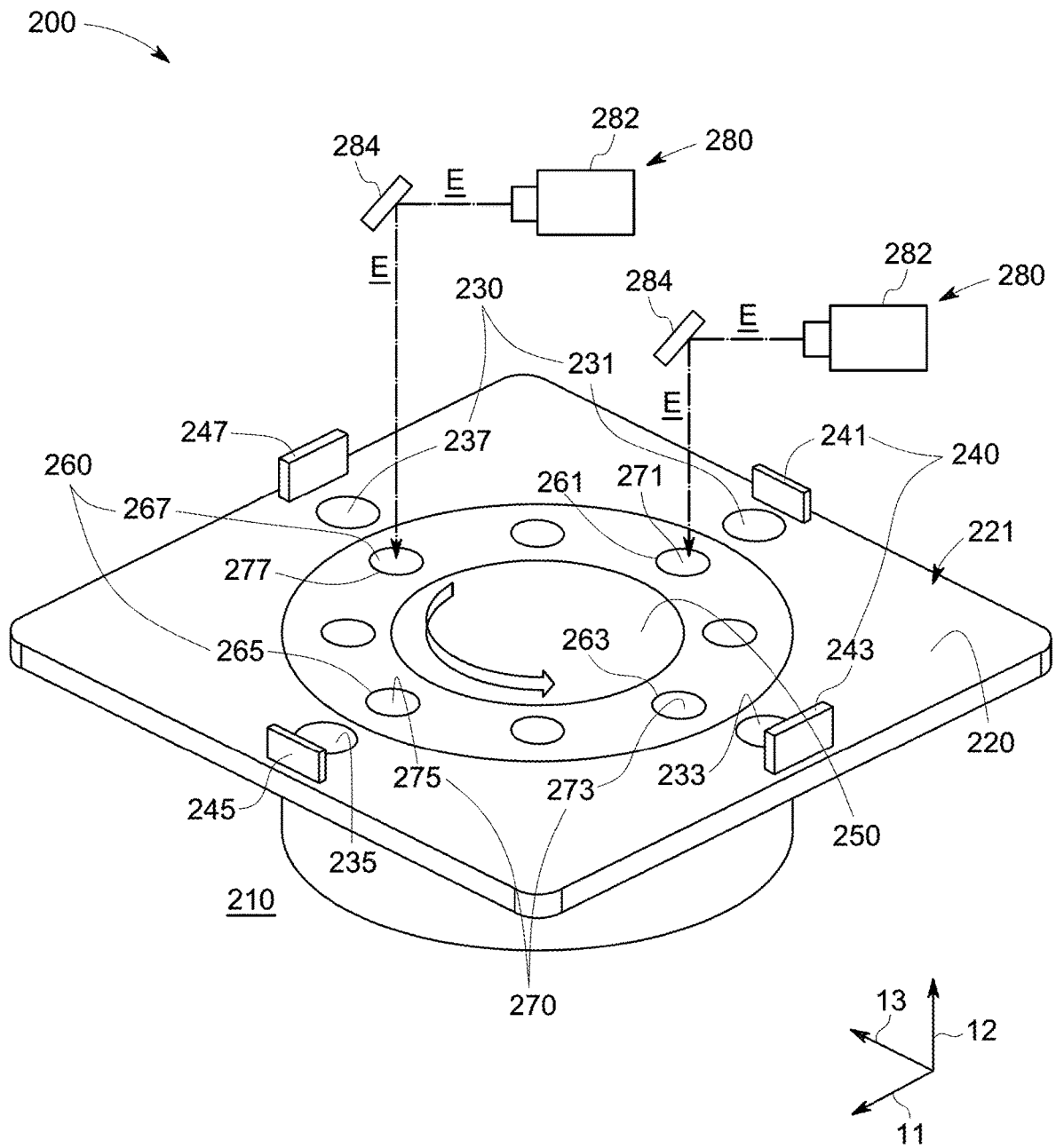
FIG. 6 illustrates a schematic of an additive manufacturing apparatus, in accordance with some embodiments of the disclosure.

In the embodiments illustrated in FIGS. 1-5, the additive manufacturing apparatus 100 is configured to manufacture a plurality of build parts on a plurality of build plates 170 in a sequential manner. In some other embodiments, a plurality of build parts may be manufactured using the additive manufacturing apparatus described herein in a simultaneous manner. Referring now to FIG. 6, a schematic of an additive manufacturing apparatus 200 in accordance with some embodiments of the disclosure is illustrated.

As illustrated in FIG. 6, the additive manufacturing apparatus 200 includes a build module 210. The build module 210 includes a support structure 220. The support structure 220 is a rigid structure and defines a work surface 221. The support structure 220 further includes a plurality of powder supply chambers 230 (e.g., 231, 233, 235 and 237) formed in the support structure 220. As illustrated in FIG. 6, the powder supply chambers 230 are formed in the worksurface 221 of the support structure 220. The powder supply chambers 230 further include a powder material 232 (not shown in FIG. 4).

The build module 210 further includes a plurality of powder applicators 240 (e.g., 241, 243, 245 and 247) disposed on a surface 221 of the support structure 220, and located proximate to the corresponding powder supply chamber of the plurality of powder supply chambers 230. As depicted in FIG. 6, the plurality of powder applicators 240 move inwards towards the powder recovery chamber 250, to supply powder from the corresponding powder supply chamber to a build plate of the plurality of build plates 270.

Referring again to FIG. 6, the build module 210 further includes a powder recovery chamber 250 formed in the support structure 220 such that each powder supply chamber 230 of the plurality of powder supply chambers 230 is disposed between the corresponding powder applicator 240 and the powder recovery chamber 250.

The build module 210 furthermore includes a plurality of build chambers 260 (e.g., 261, 263, 265 and 267) formed in the support structure 220. The plurality of build chambers 260 includes a plurality of build plates 270 (e.g., 271, 273, 275 and 277) formed in the support structure 220. As illustrated in FIG. 6, the plurality of build plates 270 is spatially disposed around the powder recovery chamber 250. In some embodiments, the plurality of build plates 270 may be uniformly distributed around the powder recovery chamber 250. The plurality of build plates 270 is further configured to move around the powder recovery chamber 250.

The plurality of build plates 270 may be operably connected to an actuator (not shown in Figures), operable to selectively move the plurality of build plates during an additive manufacturing process step such that during an additive manufacturing process step, a build plate of the plurality of build plates 270 is disposed between a powder supply chamber 230 of the plurality of powder supply chambers 230 and the powder recovery chamber 250. For example, in the embodiment illustrated in FIG. 6, the build plate 271 of the plurality of build plates 270 is disposed between the powder supply chamber 231 and the powder recovery chamber 250. The build plate 271 is further configured to receive a powder material from the powder supply chamber 231 via the powder applicator 241. Similarly, the build plates 273, 275, and 277 of the plurality of build plates 270 are disposed between the powder recovery chamber 250 and the powder supply chambers 233, 235 and 237, respectively. The build plates 273, 275, and 277 are further configured to receive a powder material from the powder supply chambers 233, 235 and 237 via the powder applicators 243, 245, and 247. Further, it should be noted that in the embodiment illustrated in FIG. 6, the powder applicators 241, 243, 245 and 247 may be configured to distribute the powder material simultaneously or sequentially to the corresponding build plates of the plurality of build plates 270

In some embodiments, the powder material in the powder supply chamber of plurality of powder supply chambers 230 is the same. In some such embodiments, the additive manufacturing apparatus 200 may be configured to build same type of parts. In some embodiments, the powder material in at least two of the powder supply chambers of the plurality of powder supply chambers 230 is different. In some such embodiments, the additive manufacturing apparatus 200 may be configured to build at least two different type of parts. In some embodiments, the powder material in all the powder supply chambers of plurality of powder supply chambers 230 is different.

With continued reference to FIG. 6, the additive manufacturing apparatus 200 further includes a plurality of energy modules 280. Each energy module of the plurality of energy modules includes a directed energy source 282 configured to direct an energy beam "E" onto the powder material distributed on the corresponding build plate of the plurality of build plates 270. In some embodiments, a beam steering apparatus 284 may also be used to direct the energy beam from the directed energy source 282 to form the build components. For ease of depiction, only two energy modules corresponding to build plates 271 and 277 are illustrated in FIG. 6. However, any number of energy modules 280 may be used.

The energy modules 280 may direct the energy beam "E" to the distributed powder material in a sequential or simultaneous manner. Further, it should be noted that in the embodiments illustrated in FIG. 6, the additive manufacturing apparatus 200 is configured to form the plurality of build components in a sequential manner or a simultaneous manner.

Further, in some embodiments, each build plate of the plurality of build plates 270 may be configured to form a build layer of the same thickness. In some other embodiments, at least two build plates of the plurality of build plates 270 may be configured to form a build layer of a different thickness. A thickness of the build layer may be controlled by controlling the amount of powder material distributed from the powder supply chamber to the corresponding build plate.

The operation of the additive manufacturing apparatus 200 of FIG. 6 may be similar to the operating principle described earlier in the context of FIGS. 3A-3H.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present disclosure. As used in the claims, the word "comprises" and its grammatical variants logically also subtend and include phrases of varying and differing extent such as for example, but not limited thereto, "consisting essentially of" and "consisting of" Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. An additive manufacturing apparatus comprising a build module, the build module comprising:
a support structure;
a powder supply chamber formed in the support structure for containing and supplying a powder material;
a powder applicator disposed on the support structure and located proximate to the powder supply chamber;
a powder recovery chamber formed in the support structure such that the powder supply chamber is disposed between the powder applicator and the powder recovery chamber; and
a plurality of build plates formed in the support structure and spatially disposed around the powder recovery chamber, the plurality of build plates configured to move around the powder recovery chamber;
wherein the build module is configured such that during an additive manufacturing process step, a build plate of the plurality of build plates is disposed between the powder supply chamber and the powder recovery chamber, and the powder applicator is configured to distribute a required amount of the powder material from the powder supply chamber on the build plate and deposit any excess powder material in the powder recovery chamber.

2. The additive manufacturing apparatus of claim 1, wherein the plurality of build plates is circumferentially disposed around the powder recovery chamber and configured to rotate around the powder recovery chamber.

3. The additive manufacturing apparatus of claim 1, wherein the plurality of build plates comprises 6 to 24 build plates spatially disposed around the powder recovery chamber.

4. The additive manufacturing apparatus of claim 1, further comprising an energy module comprising a directed energy source configured to direct an energy beam onto the powder material distributed on the build plate, to form a build component.

5. The additive manufacturing apparatus of claim 4, wherein the build module is further configured to move the plurality of build plates after the build component is formed such that a subsequent build plate of the plurality of build plates is disposed between the powder supply chamber and the powder recovery chamber, and the powder applicator is configured to distribute a required amount of the powder material from the powder supply chamber on the subsequent build plate and deposit any excess powder in the powder recovery chamber.

6. The additive manufacturing apparatus of claim 5, wherein the directed energy source is further configured to direct an energy beam onto the powder material distributed onto the subsequent build plate, to form a subsequent build component.

7. The additive manufacturing apparatus of claim 4, wherein the build component is a part, and the powder applicator and the directed energy source are configured to perform one or more cycles of distributing a powder material, directing an energy beam, and forming a build layer until the part is formed.

8. The additive manufacturing apparatus of claim 7, wherein the build module is configured to move the plurality of build plates after the part is formed such that a subsequent build plate of the plurality of build plates is disposed between the powder supply chamber and the powder recovery chamber.

9. The additive manufacturing apparatus of claim 4, wherein the build component is a build layer, and the build module is configured to move the plurality of build plates after the build layer is formed such that a subsequent build plate of the plurality of build plates is disposed between the powder supply chamber and the powder recovery chamber.

10. The additive manufacturing apparatus of claim 1, wherein the build plate of a plurality of build plates has a largest dimension in a range from about 25 mm to about 200 mm.

11. The additive manufacturing apparatus of claim 1, wherein the build module is configured such that a maximum stroke length of the powder applicator is in a range from about 150 mm to about 600 mm.

* * * * *